United States Patent
Hummel

(10) Patent No.: US 8,794,269 B2
(45) Date of Patent: Aug. 5, 2014

(54) MULTI-LAYER FILM PERMEABLE TO UV RADIATION

(71) Applicant: Huhtamaki Films Germany GmbH & Co. KG., Forchheim (DE)

(72) Inventor: Henrik Hummel, Leipzig (DE)

(73) Assignee: Huhtamaki Films Germany GmbH & Co. KG, Forchheim (DE)

( * ) Notice: Subject to any disclaimer, the term of this patent is extended or adjusted under 35 U.S.C. 154(b) by 0 days.

(21) Appl. No.: 13/690,076

(22) Filed: Nov. 30, 2012

(65) Prior Publication Data

US 2013/0126029 A1 May 23, 2013

Related U.S. Application Data

(63) Continuation of application No. PCT/EP2011/002685, filed on May 31, 2011.

(30) Foreign Application Priority Data

Jun. 15, 2010 (DE) .......................... 10 2010 023 764

(51) Int. Cl.
*F16L 55/16* (2006.01)
(52) U.S. Cl.
USPC ............................. 138/98; 138/97; 428/35.2
(58) Field of Classification Search
USPC ..................... 138/97, 98; 428/35.2
See application file for complete search history.

(56) References Cited

U.S. PATENT DOCUMENTS

| | | | |
|---|---|---|---|
| 6,679,966 B1* | 1/2004 | Brandenburger | 156/190 |
| 8,361,580 B2* | 1/2013 | Stark et al. | 428/36.91 |
| 2002/0015810 A1 | 2/2002 | Piper et al. | |
| 2003/0017352 A1 | 1/2003 | Dayrit et al. | |
| 2009/0139593 A1 | 6/2009 | Papp | |
| 2010/0047416 A1 | 2/2010 | Oblotzki et al. | |
| 2011/0083765 A1* | 4/2011 | Stark et al. | 138/97 |

FOREIGN PATENT DOCUMENTS

| | | |
|---|---|---|
| DE | 29700236 U1 | 5/1998 |
| DE | 198 17 413 A1 | 10/1998 |
| DE | 199 24 251 | 11/2000 |
| DE | 60212816 T2 | 11/2006 |

(Continued)

OTHER PUBLICATIONS

International Search Report dated Aug. 19, 2011, mailed Aug. 31, 2011.

(Continued)

*Primary Examiner* — Patrick F Brinson
(74) *Attorney, Agent, or Firm* — Norris McLaughlin & Marcus PA

(57) ABSTRACT

A multilayer film that is impermeable to liquids and is to some extent permeable to UV radiation, optionally in the form of a tubular film, having a layer sequence of a layer (a) comprising at least one thermoplastic olefin homo- or copolymer, as one of the external layers, an adhesive-promoter layer (b), an internal layer (c) comprising at least one homo- and/or copolyamide, an adhesive-promoter layer (d), and a layer (e) comprising at least one homo- and/or copolyamide, as one of the external layers, wherein the VICAT softening point of the thermoplastic olefin homo- or copolymer of the layer (a) is at least 100° C., and the use of said multilayer film as internally situated tube of an insertion tube for the renovation of subterranean pipes, an insertion tube of this type, and a pipe-renovation system suitable for the renovation of subterranean pipes.

10 Claims, 1 Drawing Sheet

(56) References Cited

FOREIGN PATENT DOCUMENTS

| DE | 60030706 T2 | 9/2007 |
| DE | 102006047779 A1 | 4/2008 |
| DE | 102009041841 A1 | 7/2010 |
| EP | 0267742 A2 | 5/1988 |
| EP | 0342897 A2 | 11/1998 |
| EP | 1155256 B1 | 1/2003 |
| WO | 20071054350 A1 | 5/2007 |

OTHER PUBLICATIONS

Translation of International Search Report dated Aug. 19, 2011, mailed Aug. 31, 2011.

The Request for Cancellation for the Corresponding German Utility Model, dated Apr. 30, 2012.

Cancellation Procedure Document D2. Technical Datasheet PRIEX Resins, PRIED 30101 Maleic Anthydride Modified Ionormeric HDPE, Jan. 2011.

Cancellation Procedure Document D4. Kunststoff-Folien, Herstellung—Eigenschaften—Anwendung, Carl Hanser Veriag Munich Austria, 2006.

Cancellation Procedure Document D13. "Ansprechpartner, Kommunikation, Schriftwerkehr, Q-Anforderung, 0- Aufzeichnung, Belegmuster/RUcklagenmuster, PrUfzertifikat-Coexfilm, Reklamationsablauf, . . .", Buergofol GmbH, Feb. 2006.

Cancellation Procedure Document N2, Plastic News, Plastics Co., Jul. 2008.

Cancellation Procedure Document N3, Wäarmeformbestandigkeit, Sep. 2011.

Cancellation Procedure Document N4, "Porduktfolder mit 2 × 6 Flyer (deutsch, englisch) zum Einlegen Konzeption und Gestaitung, Fotoshooting, Druckvorbereitung, Druck", die agentur, Übertrag, Jan. 2006.

Cancellation Procedure Document N5, Fachbegriffe und Anwendungsbeispiele von Experten erklärt, Verpackungs Lexikon, 2010.

\* cited by examiner

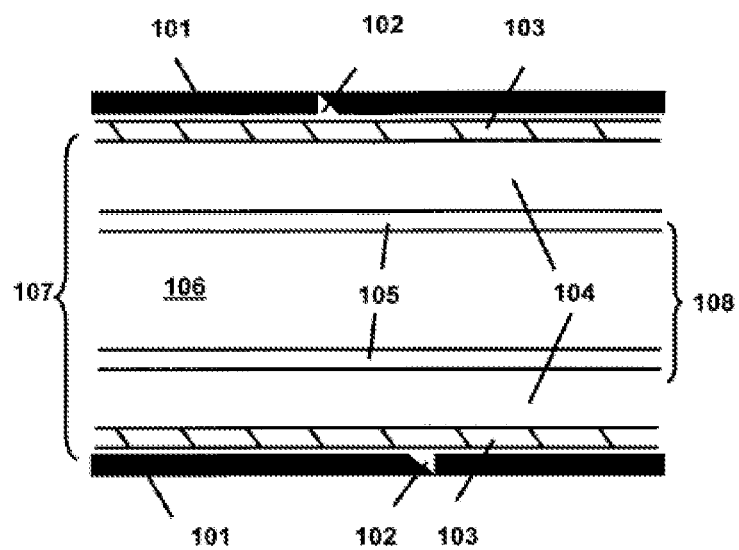

MULTI-LAYER FILM PERMEABLE TO UV RADIATION

This application is a continuation of International Application PCT/EP2011/002685 filed May 31, 2011, which claims priority to German application 10 2010 023 764.7 filed Jun. 15, 2010.

The present invention relates to a multilayer film that is impermeable to liquid and that is at least to some extent permeable to UV radiation, preferably in the form of a tubular film, comprising a layer sequence made of a layer (a) based on at least one thermoplastic olefin homo- or copolymer, as one of the external layers, an adhesive-promoter layer (b), an internally situated layer (c) based on at least one homo- and/or copolyamide, an adhesive-promoter layer (d), and a layer (e) based on at least one homo- and/or copolyamide, as one of the external layers, where the VICAT softening point of the thermoplastic olefin homo- or copolymer of the layer (a) is at least 100° C., to the use of this type of multilayer film as internally situated tube of an insertion tube for the renovation of subterranean pipes, to an insertion tube of this type, and to a pipe-renovation system suitable for the renovation of subterranean pipes, preferably subterranean sewer pipes.

BACKGROUND OF THE INVENTION

The prior art has already disclosed multilayer films which are permeable to UV radiation and inter alia can be used in the renovation of pipes.

By way of example, EP-A-0 342 897 describes a multilayer film which has a polyamide layer as a first surface layer and an ionomer sealing layer as a second surface layer. If the multilayer film is used for pipe renovation, the polyamide layer is bonded to a fibrous nonwoven by heating, and this is then saturated with a hardenable resin. After conditioning of the film, this is applied, together with the resin that, after the saturation process, is located on the surface, onto the region requiring renovation on the internal wall of the pipe, over the entire pipe circumference. After hardening of the resin by means of UV radiation, a stable pipe section at the internal pipe wall requiring renovation is obtained. The two ends of the film are then sealed to one another by way of the ionomer sealing layer.

In another known process for the renovation of subterranean pipes, a flexible insertion tube is provided, and is drawn into the pipe requiring renovation. Said insertion tube comprises two tubes, preferably plastics tubes, with different diameter, between which a support material saturated with a reactive synthetic resin has been introduced. After the introduction of the collapsed insertion tube into the pipe and inflation of the insertion tube to the diameter of the pipe, the synthetic resin is hardened between the two tubes in order to obtain, after removal of the internal tube, a stable pipe at the internal pipe wall requiring renovation. The hardening can be achieved via irradiation with UV radiation. In order to prevent undesired premature hardening of the synthetic resin prior to introduction into the pipe requiring renovation, it is necessary that the externally situated tube of the insertion tube has a protective layer or is composed thereof, in order to prevent premature exposure to external UV radiation and thus premature curing of the resin. In contrast, the internally situated tube of this type of insertion tube has to have permeability to UV radiation, in order to permit, in the inflated condition, the hardening procedure.

The internally situated tube of this type of insertion tube, or a corresponding multilayer film, preferably in the form of a tube, used for pipe renovation and as disclosed by way of example in EP-A-0 342 897, is subject to stringent mechanical requirements, in order that it can withstand loads arising during its handling, for example those occurring during introduction into the pipe requiring renovation, during the inflation of the respective film within the pipe, or—after successful renovation—during removal from the pipe.

A disadvantage of a multilayer film disclosed in EP-A-0 342 897 is that it has a point of weakness at least in the region of the seal seam, and/or a disadvantage with conventional tubular films which are used as internally situated tubes of an insertion tube during pipe renovation is that these do not have the mechanical properties required in order to withstand the loads described above. To this end, conditioning can optionally be used in order to achieve an improvement in conventional films, where these have at least one layer based on a polyamide.

There is therefore a need for multilayer films which do not have the abovementioned disadvantages.

It was therefore an object of the present invention to provide a multilayer film, in particular in the form of a tubular film, which is suitable as internally situated tube of an insertion tube for the renovation of subterranean pipes, preferably subterranean sewer pipes, since it has not only the necessary permeability to UV radiation but also mechanical properties that are sufficiently good for it to withstand the high loads that arise during pipe renovation.

SUMMARY OF THE INVENTION

Said object is achieved via provision of the multilayer film of the invention that is impermeable to liquids and that is at least to some extent permeable to UV radiation, preferably in the form of a tubular film, comprising a layer sequence made of (a) a layer (a) based on at least one thermoplastic olefin homo- or copolymer, as one of the external layers, or surface layers, (b) an adhesive-promoter layer (b), (c) an internally situated layer (c) based on at least one homo- and/or copolyamide, (d) an adhesive-promoter layer (d), and (e) a layer (e) based on at least one homo- and/or copolyamide, as one of the external layers, or surface layers, where the VICAT softening point of the thermoplastic olefin homo- or copolymer of the layer (a) is at least 100° C.

Surprisingly, it has been found that the multilayer film of the invention features an excellent barrier effect in relation to drying-out of the resin used for pipe renovation, and therefore in relation to the loss, i.e. migration, of monomers or of other saturation means. It has moreover been established, surprisingly, that the multilayer film of the invention, in particular in the form of a multilayer tubular film, or else in the form of a multilayer film sealed to give a tube, features very good mechanical properties, in particular very good extensibility, in such a way that it withstands the loads that arise during the renovation of subterranean pipes, in particular during inflation within the pipe system, during the preceding transport, the preceding storage, and the entry into the pipe requiring renovation, and moreover, after the hardening of the resin, can be withdrawn therefrom without any break-off, splitting or tearing. It has moreover been found, surprisingly, that the multilayer film of the invention has the very good mechanical properties even without prior conditioning, thus rendering a conditioning step unnecessary.

DETAILED DESCRIPTION

For the purposes of this invention, the expression "tubular film" means a multilayer film produced by (co)extrusion, preferably by blown-film (co)extrusion, and having no seal seam.

For the purposes of this invention, the expression "UV radiation" means electromagnetic radiation in a wavelength range from 200 to 400 nm.

The multilayer film of the invention is at least to some extent permeable to UV radiation, preferably permeable to an extent of at least 80%, particularly preferably permeable to an extent of at least 90%.

In one preferred embodiment, the multilayer film of the invention is not only at least to some extent permeable to UV radiation, but also at least to some extent permeable to short-wave, visible light, preferably to an extent of at least 80%, particularly preferably to an extent of at least 90%.

For the purposes of this invention, the expression "short-wave, visible light" means electromagnetic radiation in a wavelength range from 400 to 500 nm, preferably from 400 to 450 nm.

The multilayer film of the invention features excellent mechanical properties (determined by the method described below), in particular by virtue of very good extensibility. The extensibility of the multilayer film of the invention—even in the nonconditioned state—is preferably at least 15%, particularly preferably at least 18%, very particularly preferably at least 20%, in particular at least 30%.

For the purposes of this invention, the expression "conditioning" means the reversible process of absorption of moisture, preferably of water, by a material, preferably by a thermoplastic material, such as a homo- or copolyamide, or a corresponding film, such as the multilayer film of the invention, until constant weight has been achieved. The conditioning usually leads to improved mechanical properties.

A suitable material for the production of the layer (a) of the multilayer film of the invention is at least one thermoplastic olefin homo- or copolymer.

Thermoplastic olefin homo- or copolymers of $\alpha,\beta$-unsaturated olefins having from 2 to 10 carbon atoms can preferably be used for the production of the layer (a) of the multilayer film of the invention. Suitable olefin homopolymers are preferably those selected from the group consisting of ethylene homopolymers (polyethylenes, PE), preferably LDPE and HDPE, propylene homopolymers (polypropylenes, PP), butylene homopolymers (polybutylenes, PB), and isobutylene homopolymers (polyisobutylenes, PI), and mixtures of at least two of the polymers mentioned. "LDPE" means low-density polyethylene with a density in the range from 0.86 to 0.93 $g/cm^3$, featuring a high degree of branching of the molecules. "HDPE" means high-density polyethylene having only a small amount of branching of the molecular chain, and the density here can be in the range from 0.94 to 0.97 $g/cm^3$. Suitable olefin copolymers are preferably copolymers of ethylene and/or propylene and of at least one $\alpha$-olefin having at least 4, preferably from 4 to 10, particularly preferably from 4 to 8, carbon atoms, and very particular preference is given to copolymers of ethylene and/or propylene with at least one $\alpha$-olefin selected from the group consisting of butene, hexene, and octene. The proportion of $\alpha$-olefin in the olefin copolymer is preferably at most 25% by weight, particularly preferably at most 15% by weight, based in each case on the total weight of the olefin copolymer. Particularly suitable copolymers of ethylene and of at least one $\alpha$-olefin having at least 4 carbon atoms are LLDPE and/or mPE. "LLDPE" means linear low-density ethylene copolymers, characterized by the presence of a linear main chain with side chains located thereon, with a density in the range from 0.86 to 0.94 $g/cm^3$. "mPE" means ethylene copolymers polymerized by means of metallocene catalysts with density preferably in the range from 0.88 to 0.93 $g/cm^3$. Preferred olefin homo- or copolymers for the production of the layer (a) are ethylene homo- or copolymers and/or propylene homo- or copolymers. A particularly preferred material for the production of the layer (a) is a mixture of at least one ethylene homopolymer such as LDPE, and of at least one ethylene copolymer such as LLDPE and/or mPE.

The VICAT softening point of the thermoplastic olefin homo- or copolymer of the layer (a) of the multilayer film of the invention is at least 100° C. The VICAT softening point (VST A/120) is determined in accordance with DIN EN ISO 306/ASTM D1525.

The thickness of the layer (a) of the multilayer film of the invention is preferably from 10 μm to 500 μm, particularly preferably from 20 μm to 400 μm, very particularly preferably from 30 μm to 300 μm.

In one preferred embodiment, the thickness of the layer (a) of the multilayer film of the invention is at least 40% of the total thickness of the multilayer film, preferably at least 50%, particularly preferably from 50% to 90%.

A suitable material for the production of the layers (c) and (e) of the multilayer film of the invention—respectively mutually independently—is at least one homo- and/or copolyamide.

Suitable homo- or copolyamides for the production of the layers (c) and (e) of the multilayer film of the invention are preferably those selected from the group of thermoplastic aliphatic, semiaromatic, or aromatic homo- or copolyamides. Said homo- or copolyamides can be produced from diamines, such as aliphatic diamines having from 2 to 10 carbon atoms, in particular from hexamethylenediamine and/or from aromatic diamines having from 6 to 10 carbon atoms, in particular from p-phenylenediamine and from aliphatic or aromatic dicarboxylic acids having from 6 to 14 carbon atoms, e.g. adipic acid, terephthalic acid, or isoterephthalic acid. It is moreover possible to produce homo- or copolyamides from lactams having from 4 to 10 carbon atoms, e.g. from ε-caprolactam. Polyamides used in the invention are preferably PA 6, PA 12, PA 66, PA 6I, PA 6T, or corresponding copolymers, or a mixture of at least two of the polyamides mentioned.

It is preferable that the layers (c) and layer (e) of the multilayer film of the invention have an identical layer structure, particularly preferably an identical layer thickness, and/or identical polyamide components, and/or an identical composition.

In another preferred embodiment of the multilayer film of the invention, the layers (c) and layer (e) of the multilayer film of the invention have a different layer structure, particularly preferably a different layer thickness, and/or different polyamide components, and/or an composition.

It is particularly preferable that the layers (c) and (e) respectively comprise the same polyamide.

The thickness of the layers (c) and (e) of the multilayer film of the invention is preferably respectively mutually independently from 5 μm to 100 μm, particularly preferably from 10 μm to 60 μm.

Conventional adhesion promoters can be used for the production of the adhesive-promoter layers (b) and (d) of the multilayer film of the invention. It is preferable that the adhesive-promoter layers (b) and (d) are respectively mutually independently based on at least one modified thermoplastic polymer, preferably on at least one modified olefin homo- or copolymer. Olefin homo- or copolymers used here can be the olefin homo- or copolymers that are also suitable for the production of the layer (a), but after modification. It is particularly preferable that the adhesive-promoter layers (b) and (d) are respectively mutually independently based on at least one modified ethylene homo- or copolymer and/or at least one modified propylene homo- or copolymer modified with at least one organic acid or with at least one preferably cyclic organic anhydride, preferably maleic anhydride.

The thickness of the adhesive-promoter layers (b) and (d) of the multilayer film of the invention is preferably respectively mutually independently from 1 μm to 30 μm, particularly preferably from 2 μm to 20 μm.

The layers (a), (c), and (e), and also the adhesive-promoter layers (b) and (d), of the multilayer film of the invention can, if necessary, respectively mutually independently comprise additives selected from the group consisting of antistatic agents, antioxidants, antiblocking agents, antifogging agents, antimicrobial ingredients, dyes, color pigments, stabilizers, preferably heat stabilizers, process stabilizers, processing aids, flame retardants, nucleating agents, crystallization aids, preferably crystal-nucleating agents, lubricants, optical brighteners, flexibilizers, sealing aids, plasticizers, silanes, spacers, fillers, peel additives, waxes, wetting agents, surface-active compounds, preferably surfactants, and dispersing agents, to the extent that these additives do not impair permeability to UV radiation.

The layers (a), (c), and (e), and also the adhesive-promoter layers (b) and (d), of the multilayer film of the invention can, if necessary, respectively mutually independently comprise at least 0.01-20% by weight, preferably at least 0.1-10% by weight, in each case based on the total weight of an individual layer, of at least one of the abovementioned additives.

In one very preferred embodiment, the multilayer film of the invention has five layers, i.e. consists of the layers (a), (b), (c), (d), and (e), and there is therefore bonding between the two polyamide layers (c) and (e) by way of an adhesive-promoter layer (d).

The total thickness of the multilayer film of the invention is preferably from 20 to 2000 μm, particularly preferably from 50 to 1500 μm, very particularly preferably from 100 to 1000 μm, in particular from 120 to 400 μm.

The multilayer films of the invention can be produced by known, conventional processes, where there is preferably no need to condition the multilayer film.

In one preferred embodiment, all of the layers, preferably the layers (a), (b), (c), (d), and (e), of the multilayer film of the invention can be produced and processed in the form of an entire multilayer film in the form of a tubular film.

In one particularly preferred embodiment, the multilayer film of the invention is a multilayer tubular film with no seal seam.

In another preferred embodiment, all of the layers, preferably the layers (a), (b), (c), (d), and (e), of the multilayer film of the invention can be produced and processed in their entirety in the form of a cast film. It is preferable that a resultant cast film of the invention is processed to give a tube via sealing of the layer (a). This also applies to multilayer films of the invention which can also be obtained in the form of flat films by other, conventional processes.

Accordingly, the production of all of the individual layers, preferably the layers (a), (b), (c), (d), and (e), of the multilayer film of the invention can also be achieved via (co)extrusion.

The multilayer film of the invention, preferably made of the layers (a), (b), (c), (d) and (e), is preferably produced by (co)extrusion, particularly preferably by blown-film (co)extrusion, or by cast (co)extrusion, and very particularly preferably by blown-film (co)extrusion, in the form of a tubular film.

As an alternative, it is also possible to produce individual layers of the multilayer film of the invention in the form of a layer composite by (co)extrusion.

The person skilled in the art is well aware of these production processes and of corresponding production parameters.

The multilayer film of the invention can preferably have been embossed.

The multilayer film of the invention can moreover preferably have been printed.

It is preferable that the multilayer film of the invention has been neither monoaxially nor biaxially oriented, and this means that it is not subjected to any orientation after its production, preferably by extrusion. The multilayer film of the invention is practically not shrinkable, in particular not even by heating.

The multilayer film of the invention is preferably sealable via the layer (a).

The multilayer film of the invention is preferably transparent.

As mentioned above, the multilayer film of the invention is at least to some extent permeable to UV radiation.

The multilayer film of the invention, preferably in the form of a tubular film, or else in the form of a multilayer film sealed to give a tube, is therefore suitable as internally situated tube of an insertion tube for the renovation of subterranean pipes, preferably sewer pipes.

The present invention therefore also provides the use of the multilayer film of the invention, preferably in the form of a tubular film, as internally situated tube of an insertion tube for the renovation of subterranean pipes, preferably subterranean sewer pipes, where these may have defects. Because the multilayer film of the invention here, preferably in the form of a tubular film, is at least to some extent permeable to UV radiation, it permits the hardening of a reactive synthetic resin situated between an externally situated simple- or multilayer tube and the internally situated multilayer tube of the invention, or of a support material saturated with reactive synthetic resin.

Support material that can be used preferably comprises glass nonwovens made of glass fibers (glassfiber material), nonwovens, and/or nonwoven textile products, optionally in the form of multiple plies, respectively saturated with at least one reactive synthetic resin, preferably respectively saturated with at least one unsaturated polyester resin and with α,β-unsaturated monomers, such as styrene. Glassfiber materials here are known inter alia as glassfiber-reinforced plastics (GRP).

As stated above, it is unnecessary to condition the multilayer film of the invention, preferably in the form of a tubular film, since even without this conditioning it features very good mechanical properties, e.g. good extensibility. It is therefore preferable that the multilayer film of the invention, preferably in the form of a tubular film, in the form of an internally situated tube of an insertion tube for the renovation of subterranean pipes, preferably subterranean sewer pipes, is nonconditioned.

The present invention further provides an insertion tube suitable for the renovation of subterranean pipes, preferably subterranean drainage pipes, comprising a preferably non-conditioned multilayer film of the invention that is impermeable to liquids, preferably in the form of a tubular film, as internally situated tube, and an externally situated single- or multilayer tubular film which is impermeable to liquids, and which reflects and/or absorbs UV radiation and/or short-wave, visible light, as externally situated tube, and, situated between the two tubes, a support material saturated with a reactive synthetic resin. The renovated drainage pipe is formed from said saturated support material, after hardening. After the hardening process, the multilayer film of the invention, preferably in the form of a tubular film, as internally situated tube, is preferably withdrawn from the renovated drainage pipe made of hardened plastic and support material, but as an alternative it can also remain within the renovated pipe.

The person skilled in the art is aware of the production of insertion tubes of this type, for example from WO 2007/054350 A1 or EP-B1 155 256.

BRIEF DESCRIPTION OF THE DRAWING

FIG. 1 shows by way of example a longitudinal section through an insertion tube (107) of the invention after insertion into a pipe (101) which has a region (102) requiring renovation.

The insertion tube comprises an externally situated single- or multilayer tubular film which is impermeable to liquids, and which reflects and/or absorbs UV radiation and/or short-wave, visible light, as externally situated tube (103), and a preferably nonconditioned multilayer film of the invention that is impermeable to liquids, preferably in the form of a tubular film, as internally situated tube (105), and a support material (104) situated therebetween and saturated with a reactive synthetic resin. After inflation of the insertion tube (107) as far as the diameter of the pipe (101), the insertion tube (107) has a cavity (106) into which it is possible to introduce a source which emits UV radiation and/or short-wave, visible light, and which is preferably moveable, preferably a UV source, where the source brings about hardening of the support material (104) saturated with a reactive synthetic resin. The renovated pipe (108) is formed from said saturated support material (104) after hardening and optionally after withdrawal of the internally situated tube (105). The width of the subsequently renovated pipe (108) has been shown as comparatively small in FIG. 1 merely for reasons of clarity.

The manner in which the multilayer film of the invention is used as internally situated tube in the insertion tube of the invention is preferably such that the resin requiring hardening, or the support material saturated with a resin requiring hardening, is directly adjacent to the external layer or surface layer (e) of the internally situated tube.

A suitable externally situated tube of an insertion tube of the invention is in principle any conventional single- or multilayer tubular film that is impermeable to liquid and that absorbs and/or reflects UV radiation and/or short-wave, visible light.

It is preferable that the single- or multilayer tubular film used as externally situated tube in the invention of this type of insertion tube is a tubular film that is at least contact-transparent, and that reflects and/or absorbs UV radiation and/or short-wave, visible light. It is particularly preferable that the simple- or multilayer tubular film used as externally situated tube in the invention comprises at least one layer based on at least one optionally modified thermoplastic olefin homo- or copolymer comprising a combination of at least one organic or inorganic color pigment or dye that reflects and/or absorbs short-wave, visible light and of at least one organic or inorganic compound that reflects and/or absorbs UV radiation. Optionally modified olefin homo- or copolymers used here can be the optionally modified thermoplastic olefin homo- or copolymers that are also suitable for the production of the layer (a), and/or of the adhesive-promoter layers (b) and (d), of the multilayer film of the invention.

For the purposes of this invention, the expression "contact-transparent" means that the tubular film used in the invention in the form of a simple- or multilayer tube of this type of insertion tube is transparent at least to the extent that makes it possible to monitor the uniform saturation of the support material by the resin requiring hardening. This is based on checking of the lightness of color of the saturated support material.

It is preferable that the simple- or multilayer tubular film used as externally situated tube in the invention comprises at least one organic or inorganic color pigment or at least one organic or inorganic dye selected from the group consisting of carbonyl dyes, preferably quinone dyes, indigo dyes, and quinacridones, azo compounds, cyanine compounds, preferably triphenylmethane compounds, azomethines, isoindolines, dioxazines, metal oxides, transition metal oxides, metal oxide hydrates, and transition metal oxide hydrates. It is particularly preferable that, from these dye groups or color pigments, the yellow dye groups or color pigments are selected. It is preferable that an organic, yellow color pigment or an organic, yellow dye selected from the group consisting of benzimidazole derivatives, benzotriazole derivatives, 1,4-quinone derivatives, 1,4-naphtho-quinone derivatives, 9,10-anthraquinone derivatives, and phenylazophenol derivatives, in each case in the form of the free compounds, in the form of tautomers, or of the salts of acids or bases, or of the solvates, preferably the hydrates, is present. It is preferable that an inorganic, yellow color pigment or an inorganic, yellow dye selected from the group consisting of transition metal oxides and transition metal oxide hydrates is present. Particular preference is given to a yellow color pigment or a yellow dye selected from the group consisting of 4-phenylazophenol, 2-(2'-methyl)phenylazo-4-methylphenol, N-(4-phenylazo)phenyldiethanolamine, benzotriazoles, benzimidazolone, iron oxide and iron oxide hydrate, and very particular preference is given to benzimidazolone. It is preferable that the organic or inorganic color pigment or the organic or inorganic dye absorbs and/or reflects short-wave, visible light in the wavelength range from 400 to 500 nm, particularly preferably in the wavelength range from 400 to 450 nm, preferably respectively to an extent of more than 90%.

In one preferred embodiment, the simple- or multilayer tubular film used as externally situated tube in the invention preferably comprises at least one organic or inorganic compound selected from the group consisting of metal oxides, transition metal oxides, metal oxide hydrates, transition metal oxide hydrates, phosphites, benzophenones, anthranilates, salicylates, dibenzoylmethane derivatives, p-aminobenzoic acid derivatives, cinnamic acid derivatives (phenylacrylic acid derivatives), benzimidazole derivatives, benzotriazole derivatives, cyanoacrylates, benzotriazole derivatives, β,β'-divinylacrylates, alkyl α-cyano-β,β'-divinylacrylates, 1,3,5-triazine compounds and sterically hindered amines, respectively in the form of the free compounds, in the form of their tautomers, or respectively their salts of acids or bases, as UV-radiation-absorbing and/or -reflecting compound. Some compounds of this type are marketed products, e.g. Uvinul® products from BASF AG.

The expression "sterically hindered amines" means compounds where there is/are one or more bulky organic moieties bonded to at least one trivalent nitrogen atom. These preferably involve aromatic or aliphatic, acyclic or cyclic, secondary and tertiary amines, such as N,N'-disubstituted p-phenylenediamines, or substituted (amino) piperidines.

It is particularly preferable to use, as organic or inorganic compounds that reflect and/or absorb UV radiation, at least one compound from the group consisting of zinc oxide, titanium dioxide, 2-ethoxy-ethyl p-methoxycinnamate, diethanolamine p-methoxy-cinnamate, octyl p-methoxycinnamate, 2-ethylhexyl 2-cyano-3,3-diphenylacrylate, potassium cinnamate, propyl 4-methoxycinnamate, amyl 4-methoxycinnamate, α-cyano-4-methoxycinnamic acid and the corresponding hexyl ester, cyclohexyl 4-methoxycinnamate, glyceryl p-aminobenzoate, amyl p-dimethylaminobenzoate, ethyl 4-bis(hydroxypropyl)aminobenzoate, octyl p-dimethyl-aminobenzoate, ethoxylated 4-aminobenzoic acid, octyl salicylate, triethanolamine salicylate, salts of salicylic acid, 4-isopropylbenzyl salicylate, 2-ethyl-hexyl 2-(4-phenylbenzoyl)benzoate, homomethyl salicylate, 2-hydroxy-4-methoxybenzophenone, 2,4,6-trianilino(p-carbo-2-ethylhexyloxy)-1,3,5-triazine, 2-phenylbenzimidazole-5-sulfonic acid, 1-(4-tert-butylphenyl)-3-(4-methoxyphenyl)propane-1,3-dione, p-cumenyl-3-phenylpropane-1,3-dione, 1,3-bis(4-methoxy-phenyl)propane-1,3-dione, menthyl anthranilate, homomethyl N-acetylanthranilate, 2-hydroxy-4-octyl-benzophenone (Uvinul® 3008, Uvinul® 3008 FL), 6-tert-butyl-2-(5-chloro-2H-benzotriazol-2-yl)-4-methylphenol (Uvinul® 3026, Uvinul® 3026 GR), 2,4-di-tert-butyl-6-(5-chloro-2H-benzotriazol-2-yl)phenol (Uvinul® 3027), 2-(2H-benzotriazol-2-yl)-4,6-di-tert-pentylphenol (Uvinul® 3028, Uvinul® 3028 GR), 2-(2H-benzotriazol-2-yl)-4-(1,1,3,3-tetramethylbutyl)phenol (Uvinul® 3029, Uvinul® 3029 GR), 1,3-bis[(2'-cyano-3',3'-diphenylacryloyl)oxy]-2,2-bis{[(2'-cyano-3',3'-diphenylacryloyl)oxy]methyl}propane (Uvinul® 3030, Uvinul® 3030 GR), 2-(2H-benzotriazol-2-yl)-4-methyl-phenol (Uvinul® 3033 P), 2-(2H-benzotriazol-2-yl)-4,6-bis(1-methyl-1-phenylethyl)phenol (Uvinul® 3034), ethyl 2-cyano-3,3-diphenylacrylate (Uvinul® 3035), 2-ethylhexyl 2-cyano-3,3-diphenylacrylate (Uvinul® 3039), N,N'-bisformyl-N,N'-bis(2,2,6,6-tetramethyl-4-piperidinyl) hexamethylenediamine (Uvinul® 4050 H) bis(2,2,6,6-tetramethyl-4-piperidyl)sebacate (Uvinul® 4077 H, Uvinul® 4077 GR), bis(1,2,2,6,6-pentamethyl-4-piperidyl)sebacate, methyl (1,2,2,6,6-pentamethyl-4-piperidyl)sebacate (Uvinul® 4092 H),

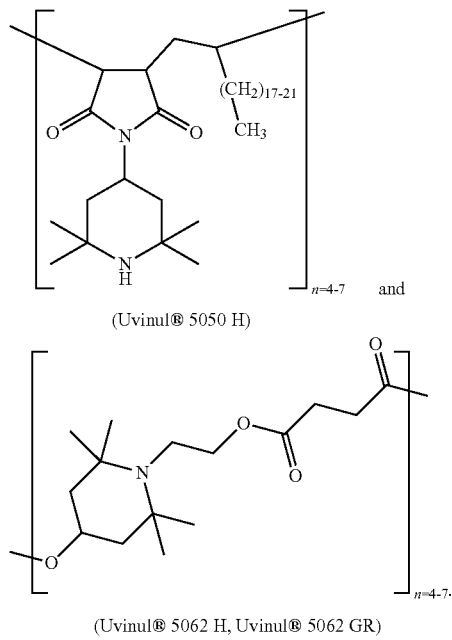

(Uvinul® 5050 H)

(Uvinul® 5062 H, Uvinul® 5062 GR)

It is preferable that the organic or inorganic compound reflects and/or absorbs UV radiation in a wavelength range from 200 to 400 nm, particularly preferably from 300 to 400 nm, preferably in each case to an extent of more than 90%.

It is preferable that the simple- or multilayer tubular film used as externally situated tube in the invention comprises from 0.05 to 20% by weight, particularly from 0.1 to 5% by weight, very particularly from 0.1 to 2% by weight, based in each case on the total weight of the film, of the combination of at least one organic or inorganic color pigment or dye and of at least one organic or inorganic compound. It is preferable that the simple- or multilayer tubular film used as externally situated tube in the invention comprises from 0.05 to 10% by weight, particularly from 0.1 to 3% by weight, based on the total weight of the film, of the organic or inorganic color pigment or dye. It is preferable that the simple- or multilayer tubular film used as externally situated tube in the invention comprises from 0.05 to 10% by weight, particularly from 0.1 to 2% by weight, based on the total weight of the film, of the organic or inorganic compound. It is preferable that each component of the combination is stable at temperatures up to 300° C.

The single- or multilayer tubular film used as externally situated tube in the invention preferably has a plurality of layers. It is preferable that a multilayer tubular film used as externally situated tube in the invention comprises at least one barrier layer, particularly one oxygen-barrier layer or water-vapor-barrier layer, or one oil-barrier layer.

A suitable material for the production of the barrier layer is preferably at least one homo- or copolyamide, ethylene-vinyl alcohol copolymer (EVOH), polyvinyl alcohol (PVOH), cyclic olefin copolymer (COC), polyvinylidene chloride (PVdC) or a mixture of at least two of the polymers mentioned, and particularly preferably at least one homo- or copolyamide. Homo- or copolyamides that can be used here are the homo- or copolyamides that are also suitable for the production of the layers (c) and (e) of the multilayer film of the invention. The polyvinyl alcohols used for the production of the barrier layer are produced via complete or incomplete hydrolysis of corresponding polyvinyl acetates (PVA), and therefore comprise not only partially hydrolyzed polyvinyl acetates with a degree of hydrolysis of from 50 to 98 mol % but also completely hydrolyzed polyvinyl acetates with a degree of hydrolysis ≥98%. The ethylene-vinyl alcohol copolymers (EVOH) used for the production of the barrier layer are obtained via complete or incomplete hydrolysis of corresponding ethylene-containing polyvinyl acetates (EVAc), and comprise especially completely hydrolyzed ethylene-containing polyvinyl acetates with a degree of hydrolysis of ≥98%. The cyclic olefin copolymers (COC) used for the production of the barrier layer can also be copolymers of α,β-unsaturated cyclic olefins having from 4 to 10 carbon atoms, e.g. norbornene, and of α,β-unsaturated olefins, such as ethylene or propylene.

It is preferable that at least one surface layer of the multilayer tubular film used as externally situated tube in the invention is based on at least one optionally modified thermoplastic olefin homo- or copolymer which is preferably sealable. Optionally modified olefin homo- or copolymers that can be used here are the optionally modified thermoplastic olefin homo- or copolymers that are also suitable for the production of the layer (a) and/or of the adhesive-promoter layers (b) and (d) of the multilayer film of the invention. There can preferably be an adhesive-promoter layer, preferably comprising at least one modified olefin homo- or copolymer, arranged here between a surface layer and the barrier layer. Modified olefin homo- or copolymers that can be used here are the modified thermoplastic olefin homo- or copolymers that are also suitable for the production of the adhesive-promoter layers (b) and (d) of the multilayer film of the invention.

In one preferred embodiment, each of the surface layers of the multilayer tubular film used as externally situated tube in the invention is based on at least one preferably sealable olefin homo- or copolymer and respectively has been bonded to the barrier layer by way of an adhesive-promoter layer described above. In one preferred embodiment, at least one of the internally situated layers of the multilayer tubular film used as externally situated tube in the invention comprises the combination which is made of at least one organic or inorganic color pigment or dye and of at least one organic or inorganic compound, and which reflects and/or absorbs the detrimental radiation. It is preferable that the components of the combination are present in the same layer of the single- or multilayer tubular film used as externally situated tube in the invention, particularly in an adhesive-promoter layer. Each of the adhesive-promoter layers of the multilayer tubular film used as externally situated tube in the invention can preferably comprise the combination which is made of at least one organic or inorganic color pigment or dye and of at least one organic or inorganic compound, and which reflects and/or absorbs detrimental radiation.

In another preferred embodiment, the components of the combination are present in different layers of the multilayer tubular film used as externally situated tube in the invention. It is preferable that the color pigment or the dye is present in at least one surface layer and that the organic or inorganic compound is present in at least one internally situated layer of the multilayer tubular film used as externally situated tube in the invention. Each of the adhesive-promoter layers of the multilayer tubular film used as externally situated tube in the invention can preferably comprise at least one organic or inorganic compound. In another preferred embodiment, each of the layers of the multilayer tubular film used as externally situated tube in the invention, with the exception of the barrier layer, can comprise at least one organic or inorganic color pigment or dye.

The present invention further provides a pipe-renovation system suitable for the renovation of subterranean pipes, preferably subterranean drainage pipes, comprising an insertion tube which is provided for insertion into the pipe requiring renovation, preferably drainage pipe, and which is made of a preferably nonconditioned multilayer film of the invention that is impermeable to liquids, preferably in the form of a tubular film, as the internally situated tube, and an externally situated single- or multilayer tubular film which is impermeable to liquids, and which reflects and/or absorbs UV radiation and/or short-wave, visible light, as externally situated tube, and, situated between the two tubes, an impregnated support material that can be hardened by UV radiation, preferably a support material saturated with a reactive, unsaturated resin system, particularly preferably a glassfiber material saturated with a reactive, unsaturated resin system, and a source that emits UV radiation and/or short-wave, visible light, and that is preferably moveable, preferably a UV source.

By virtue of the use of the pipe-renovation system of the invention, in particular by virtue of the multilayer film of the invention, preferably in the form of a tubular film, as internally situated tube of an insertion tube, the insertion tube drawn into the drain requiring renovation can be drawn into the pipe without difficulty, i.e. without splitting or break-off, and can be inflated without bursting, thus achieving problem-free hardening, by means of UV radiation, of the support material situated in the tube and saturated with the liquid saturation material. After the hardening process, once the strengthened, renovated drainage pipe made of the hardened support material is in place, the multilayer film of the invention, preferably in the form of a tubular film, as internally situated tube, can preferably be withdrawn therefrom without break-off or tearing, and/or hindrance to movement.

Determination of Extensibility

The extensibility of a multilayer film is determined as described below, by means of an inflation test.

If the multilayer film is a tubular film, extensibility can be determined directly as described below. Here, if the multilayer film is not a tubular film, but instead is by way of example a flat film, this is processed by sealing to give a tube, and the extensibility of said tube is determined.

Two metal disks with a diameter of respectively 270 mm and a width of 150 mm are used to provide an air-tight seal at both ends of a tube of length 5 m, of a tubular film of length 5 m, with a collapsed width of 435 mm. Tension belts and commercially available textile adhesive tape can be used as aids here. One of the two metal disks has been provided with a valve through which compressed air is passed into the tubular film or into the tube. The compressed air is used to inflate the tubular film or the tube until it bursts. The juncture immediately prior to the bursting of the tubular film or of the tube here is indicated by a locally delimited blister in the inflated tubular film or the inflated tube, where finally continued introduction of compressed air then produces a crack which leads to the bursting of the tubular film or of the tube.

The tensile strain achieved is determined by measuring the collapsed width of the tube or of the tubular film at its widest point after inflation, and using the following formula to calculate the relationship between this and the initial collapsed width.

$$\text{Extensibility} = (\text{collapsed width after inflation/initial collapsed width prior to inflation} - 1) \cdot 100$$

The extensibility achieved is stated in percent.

EXAMPLES

The inventive examples and comparative examples below serve to illustrate the invention, but are not to be interpreted as restrictive.

I. Chemical Characterization of the Raw Materials Used

Durethan CI 31F: Copolyamide from Lanxess, formed from ε-caprolactam, hexamethylene-diamine, and isophthalic acid Grillon CA6E: PA 6/12 copolymer PA6: Homopolyamide from Lanxess, formed from ε-caprolactam Admer NF 498 E: LDPE from Mitsui (adhesion promoter), modified with maleic anhydride groups Lupolen 2420 F: LDPE from BASF Exceed 1327 CA: Ethylene copolymer produced by means of metallocene catalysis, polymerized by using hexene as further comonomer alongside ethylene, Surlyn 1652-SB1: Zinc salt of an ethylene-methacrylic acid copolymer from DuPont

II. Production of the Multilayer Films

The multilayer films of comparative examples 1-3 (CE1-CE3) consist of three (CE2), four (CE1) or five layers (CE3). The multilayer films of the invention of inventive examples 1-4 (IE1-IE4) respectively consist of five layers. The individual layers of the multilayer films are respectively immediately adjacent to one another in the sequence in which they have been listed below. The multilayer films of comparative examples CE1-CE3, and also of inventive examples 1-2 and 4 (IE1-IE2 and IE4) were respectively produced in the form of tubular films by blown-film coextrusion. The multilayer film of inventive example 3 (IE3) was produced in the form of a flat film by cast-film coextrusion, and then sealed to give a tube.

III. Inventive Examples and Comparative Examples

All of the % data below are respectively % by weight. All of the μm data below relate to the respective layer thickness of the multilayer films.

III.1 Comparative Examples 1-3 (CE1-CE3)

The multilayer film CE1 corresponds, in layer structure, to the multilayer film specified in example 2 of EP-A-0 342 897, but was produced in the form of a tubular film.

TABLE 1

| Layer structure CE1-CE3 | Raw materials CE1 | Raw materials CE2 | Raw materials CE3 |
|---|---|---|---|
| Layer (a) | — | Lupolen 2420 F (70%), Exceed 1327 CA (30%) 145 μm | Lupolen 2420 F (70%), Exceed 1327 CA (30%) 40 μm |
| Adhesive-promoter layer (b) | Surlyn 1652-SB1 (100%) 140 μm | Admer NF 498 E (100%) 15 μm | Admer NF 498 E (100%) 15 μm |
| Layer (c) | PA6 (100%) 10 μm | — | Durethan CI 31F (100%) 40 μm |
| Adhesive-promoter layer (d) | Surlyn 1652-SB1 (100%) 110 μm | — | Admer NF 498 E (100%) 15 μm |
| Layer (e) | Grillon CA6E (100%) 30 μm | Durethan CI 31F (100%) 40 μm | Lupolen 2420 F (70%), Exceed 1327 CA (30%) 40 μm |

The total thickness of the multilayer film of CE1 is 300 μm. The total thickness of the multilayer film of CE2 is 200 μm. The total thickness of the multilayer film of CE3 is 150 μm.

III.2 Inventive Examples 1-4 (IE1-IE4)

TABLE 2

| Layer structure IE1-IE4 | Raw materials IE1 | Raw materials IE2 | Raw materials IE3 | Raw materials IE4 |
|---|---|---|---|---|
| Layer (a) | Lupolen 2420 F (70%), Exceed 1327 CA (30%) 80 μm | Lupolen 2420 F (70%), Exceed 1327 CA (30%) 80 μm | Lupolen 2420 F (70%), Exceed 1327 CA (30%) 80 μm | Lupolen 2420 F (70%), Exceed 1327 CA (30%) 155 μm |
| Adhesive-promoter layer (b) | Admer NF 498 E (100%) 15 μm | Admer NF 498 E (100%) 15 μm | Admer NF 498 E (100%) 15 μm | Admer NF 498 E (100%) 15 μm |
| Layer (c) | Durethan CI 31F (100%) 15 μm | Durethan CI 31F (100%) 20 μm | Durethan CI 31F (100%) 15 μm | PA6 (100%) 20 μm |
| Adhesive-promoter layer (d) | Admer NF 498 E (100%) 15 μm | Admer NF 498 E (100%) 15 μm | Admer NF 498 E (100%) 15 μm | Surlyn 1652-SB1 (100%) 80 μm |
| Layer (e) | Durethan CI 31F (100%) 15 μm | Durethan CI 31F (100%) 20 μm | Durethan CI 31F (100%) 15 μm | Grillon CA6E (100%) 30 μm |

The total thickness of the multilayer films of IE1 and IE3 is respectively 140 μm. The total thickness of the multilayer film of IE2 is 150 μm. The total thickness of the multilayer film of IE4 is 300 μm.

Determination of Extensibility

The extensibility of the multilayer films of the invention of inventive examples 1-4 (IE1-IE4), and also of the multilayer films of comparative examples 1-3 (CE1-CE3), was determined respectively by the method described above.

The extensibility of the multilayer films of inventive examples 1-4 (IE1-IE4) and of comparative examples 1-3 (CE1-CE3) was determined here in the nonconditioned state of the multilayer films.

TABLE 3

| Inventive example/ Comparative example | Conditioning | Extensibility [%] |
|---|---|---|
| IE1 | no | 80.2 |
| IE2 | no | 34.1 |
| IE3 | no | 39.4 |
| IE4 | no | 16.9 |
| CE1 | no | 9.2 |
| CE2 | no | 12.9 |
| CE3 | no | 13.2 |

What is claimed is:

1. An insertion tube suitable for the renovation of subterranean pipes, optionally subterranean sewer pipes, comprising an optionally nonconditioned multilayer film that is impermeable to liquids and that is at least to some extent permeable to UV radiation, comprising a layer sequence made of (a) a layer (a) comprised of at least one thermoplastic olefin homo- or copolymer, as one of the external layers, (b) an adhesive-promoter layer (b), (c) an internally situated layer (c) comprised of at least one homo- and/or copolyamide, (d) an adhesive-promoter layer (d), and (e) a layer (e) comprised of at least one homo- and/or copolyamide, as one of the external layers, in the form of a tubular film, wherein the VICAT softening point of the thermoplastic olefin homo- or copolymer of the layer (a) is at least 100° C.;

as internally situated tube, and an externally situated single- or multilayer tubular film which is impermeable to liquids, and which reflects and/or absorbs UV radiation and/or short-wave, visible light, as externally situated tube, and a support material situated therebetween and saturated with a reactive synthetic resin.

2. The insertion tube as claimed in claim 1, wherein the thickness of the layer (a) is at least 40% of the total thickness of the multilayer film that is impermeable to liquids and at least to some extent permeable to UV radiation.

3. The insertion tube as claimed in claim 1, wherein the layer (a) of the multilayer film that is impermeable to liquids and at least to some extent permeable to UV radiation is comprised of at least one ethylene homo- or copolymer and/or at least one propylene homo- or copolymer.

4. The insertion tube as claimed in claim 1, wherein the layers (c) and (e) of the multilayer film that is impermeable to liquids and that is at least to some extent permeable to UV radiation have an identical layer structure, optionally an identical layer thickness, and/or identical polyamide components, and/or an identical composition, optionally an identical polyamide component.

5. The insertion tube as claimed in claim 1, wherein the layers (c) and (e) of the multilayer film that is impermeable to liquids and that is at least to some extent permeable to UV radiation have a different layer structure, optionally a different layer thickness, and/or different polyamide components, and/or a different composition.

6. The insertion tube as claimed in claim 1, wherein the adhesive-promoter layers (b) and (d) of the multilayer film that is impermeable to liquids and that is at least to some extent permeable to UV radiation comprise respectively mutually independently at least one modified thermoplastic olefin homo- or copolymer, optionally respectively mutually independently at least one modified thermoplastic ethylene homo- or copolymer and/or at least one modified propylene homo- or copolymer.

7. The insertion tube as claimed in claim 1, wherein the multilayer film that is impermeable to liquids and that is at least to some extent permeable to UV radiation consists of the layers (a)-(e).

8. The insertion tube as claimed in claim 1, wherein the multilayer film that is impermeable to liquids and that is at least to some extent permeable to UV radiation is permeable to an extent of at least 80% to UV radiation.

9. The insertion tube as claimed in claim 1, wherein the surface layer (a) of the multilayer film that is impermeable to liquids and that is at least to some extent permeable to UV radiation is directly adjacent to the support material.

10. A pipe-renovation system suitable for the renovation of subterranean pipes, comprising an insertion tube as claimed in claim 1, provided for introduction into the pipe requiring renovation, and a source that emits UV radiation and/or short-wave, visible light, and that is optionally moveable.

* * * * *